April 21, 1942.  DE WILL G. VAUGHN  2,280,559
DIRECTION SIGNAL FOR VEHICLES
Filed Jan. 6, 1941  2 Sheets-Sheet 1
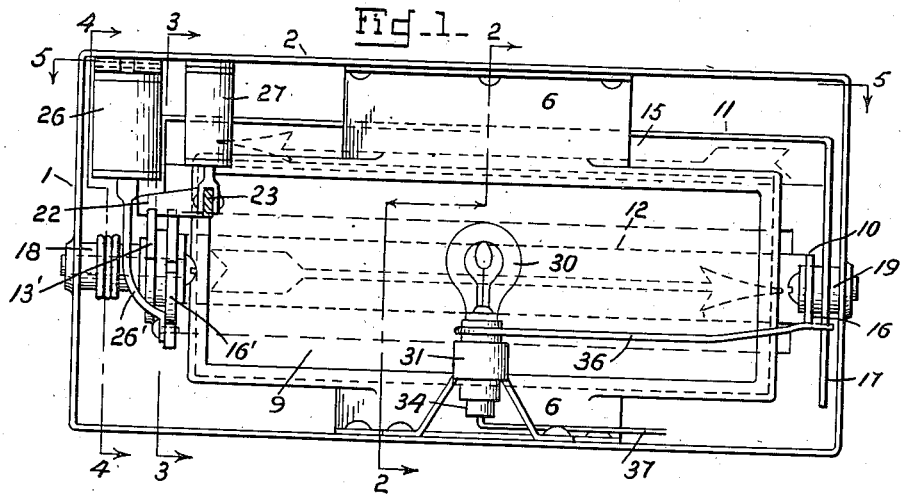
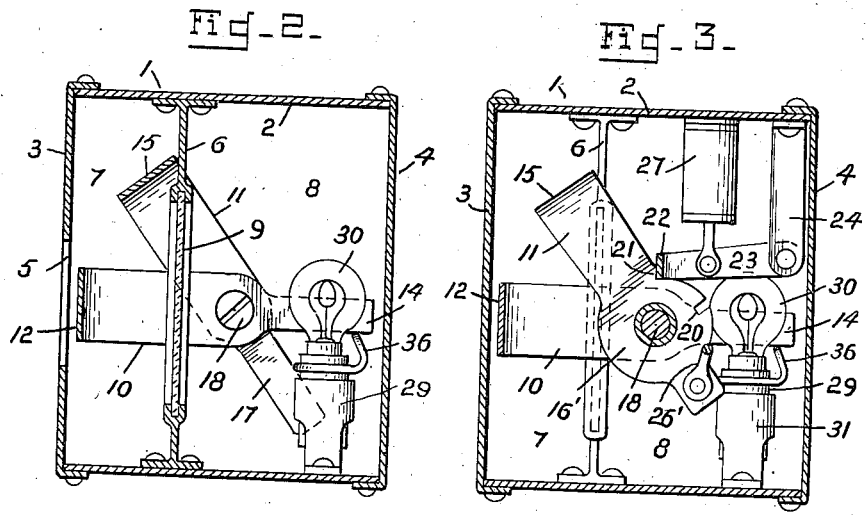
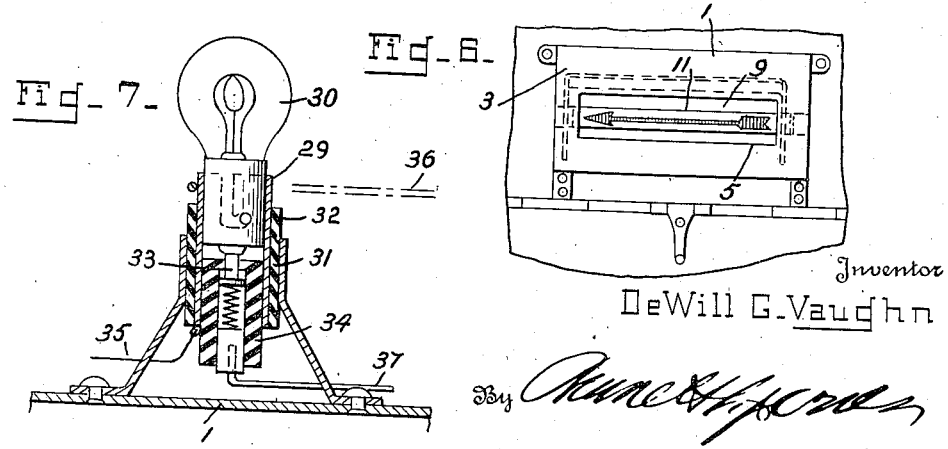
Inventor
DeWill G. Vaughn April 21, 1942.          DE WILL G. VAUGHN          2,280,559
                    DIRECTION SIGNAL FOR VEHICLES
                         Filed Jan. 6, 1941          2 Sheets-Sheet 2
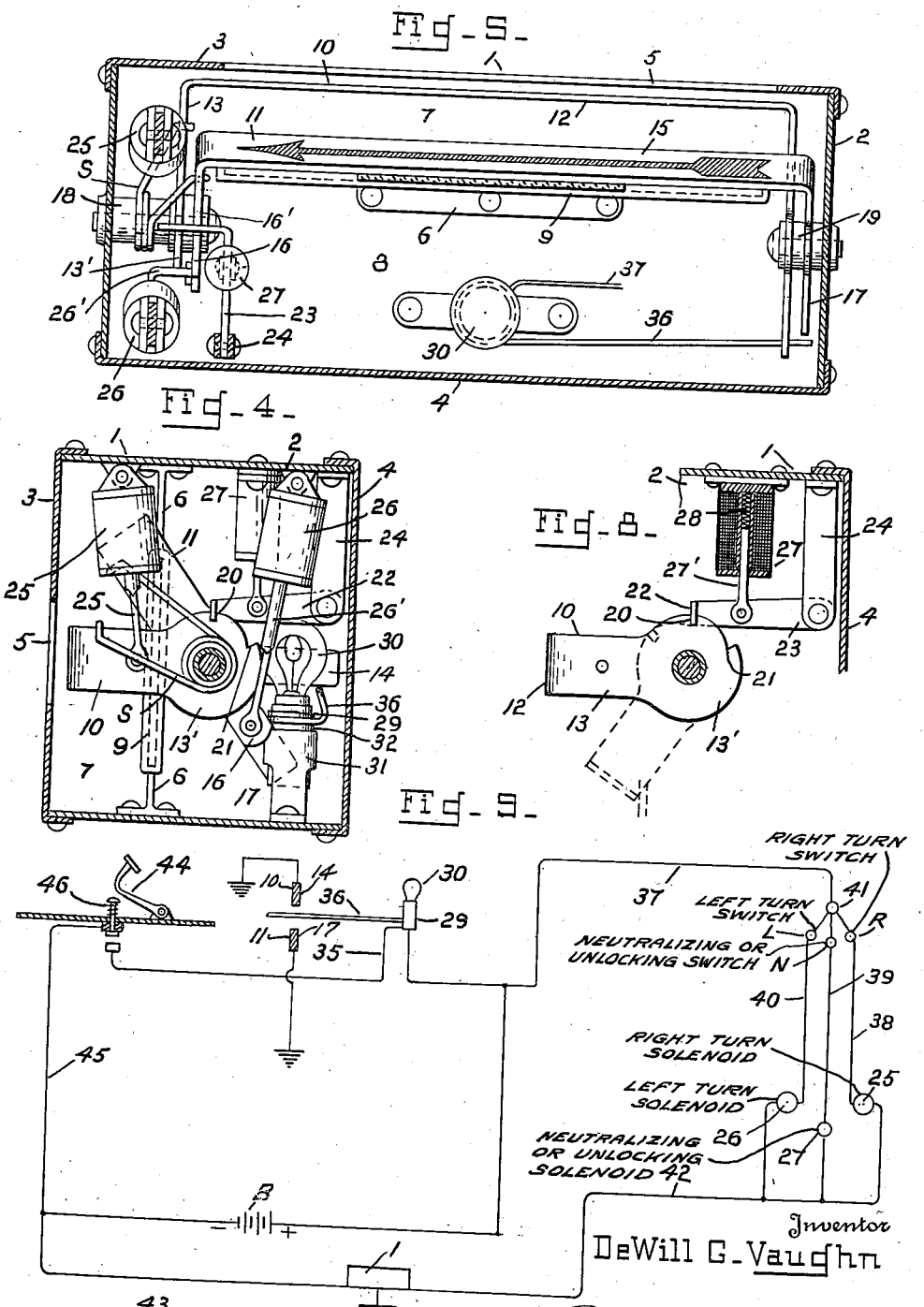

Patented Apr. 21, 1942

2,280,559

UNITED STATES PATENT OFFICE 2,280,559

DIRECTION SIGNAL FOR VEHICLES

De Will G. Vaughn, Richmond, Va., assignor of one-half to William Griffith Purcell, Richmond, Va.

Application January 6, 1941, Serial No. 373,351

2 Claims. (Cl. 177—329)

This invention relates to direction signals for automobiles and other like vehicles.

One object of the invention is to provide a novel and improved construction of signal device under ready control of the driver of the vehicle for giving clearly visible right and left turn signals as well as a stop or slow down signal.

A further object of the invention is to provide a signal device adapted for day or night use and which will give signal indications not obscured by sunrays and which will overcome the objections to prior signal devices in which the signal elements or indications are often obscured or rendered indistinct by the glare from sunrays.

A still further object of the invention is to provide a signal device which requires the use only of a single bulb of low candle power for producing signal illumination and which is free from parts requiring adjustment or lubrication.

A still further object of the invention is to provide a combined mechanical and electrical signal device which may be mounted at any convenient point on the vehicle and which is dustproof, waterproof, and adapted to give clear signals in daytime or night time and under any and all working conditions.

A still further object of the invention is to provide a signal device having electrically operated parts which may be operated by the use of a minimum amount of current.

With these and other objects in view, the invention consists of the features of construction, combination and arrangement of parts, hereinafter fully described and claimed, reference being had to the accompanying drawings, in which—

Fig. 1 is a view in rear elevation of my improved signal device with the rear cover removed with one of the parts shown in section for clearness of illustration.

Figs. 2, 3 and 4 are front-to-rear vertical sections taken respectively on lines 2—2, 3—3 and 4—4 of Fig. 1.

Fig. 5 is a sectional plan view taken on the line 5—5 of Fig. 1.

Fig. 6 is a front view of the signal device on a reduced scale, showing it mounted on a vehicle, a portion of which is shown.

Fig. 7 is a sectional view through the lamp socket, showing a lamp bulb fitted therein.

Fig. 8 is a detail section showing the signal arm locking or detent means and its releasing solenoid.

Fig. 9 is a diagram of the signal circuit employed.

In carrying my invention into practice I provide a signal device comprising a box or casing 1 of rectangular, oblong rectangular or other suitable form, a casing of oblong rectangular form being shown in the present instance. This casing consists of a body portion 2 normally open at front and rear and adapted to be closed at front and rear by detachable front and rear walls or covers 3 and 4. Either one of these walls or covers may, however, be fixed and the other detachably secured in position so as to admit access to the casing for assemblage, repairs, replacements or cleaning of parts when required.

The front wall or cover 3 of the casing is provided with an always open or uncovered long and narrow horizontal observation slot or signal display aperture 5 and arranged within the casing in spaced relation to the wall or cover 3 is a holder or frame 6 extending the greater portion of the length of the casing and forming a partition separating the casing into front and rear compartments 7 and 8 and also forming a support for a red glass signal panel or bull's eye 9. This panel 9 is of somewhat greater length and depth than the display slot or aperture 5 so that it is shielded by the portions of the wall 3 above and below and beyond the ends of the aperture 5 and is exposed only through the elongated narrow aperture 5 to daylight and sunlight and from sunrays entering and striking the panel 9 at angles oblique to the horizontal. By reason of this construction and arrangement of the parts and the fact that the aperture is always open and the panel not arranged behind a lens or glass surface, rays of light either entering the casing through the aperture and striking a displayed signaling device or passing through the panel 9 will not enter the aperture at an oblique angle so as to strike and be reflected back on the interior of the casing by casing walls but will always be horizontal rays so that the signal element being displayed or light being transmitted will be clearly seen or transmitted without liability of the indication being blurred or rendered confusing by sunrays or other rays striking the displayed signal element or panel 9 at an angle and reflected back by wall surfaces of the casing. Also by the described construction and arrangement of parts compartments below and above the level of the aperture 5 are formed at the front of the casing between the panel 9 and portions of the wall 3 below and above the aperture 5 to respectively receive the display elements 10 and 11 when in their non-display or retracted positions.

Arranged within the casing are signal arms or elements 10 and 11, each of U-shaped or bail-shaped formation. The element 10 comprises a body portion in the form of a plate-like member or arm proper 12 having rearwardly extending end portions 13 and 14 bent at right angles thereto. The element 11 similarly comprises a body portion 15 having rearwardly extending end portions 16 and 17 bent at right angles thereto. The outer faces of the arms or body portions 12 and 15 of the respective elements 10 and 11 are provided with signal indications, such as properly pointing arrows for respectively indicating right and left turns.

The ends 13 and 16 and 14 and 17 of the respective signal elements 10 and 11 are pivotally mounted on shafts or other suitable supports 18 and 19 carried by the opposite end walls of the casing 1, so as to adapt the signal elements 10 and 11 to swing upwardly and downwardly in the casing. The said ends 13 and 16 and 14 and 17 of the signal elements 10 and 11 are arranged with the shafts 18 and 19 between the ends of the bracket or frame 6 and end walls of the casing, with the ends 13 and 16 and 14 and 17 projecting forwardly into the compartment 7 and rearwardly into the compartment 8 and supported within the latter-named compartment on the shafts 18 and 19 so that the free rear ends of the arms form levers or actuating cranks by which the signal elements are adapted to be operated. Normally, or in non-display position the signal element 10, whose display arm or plate 12 is disposed in the compartment 7, extends at an outward and downward angle from the shafts so that its portion 12 lies below the opening 5 and is concealed by the lower portion of the wall 3. Normally the signal element 11, whose display arm or plate 15 is also arranged in the compartment 7, extends at an outward and upward angle from the shafts so that its arm 15 is arranged above the opening 5 and concealed behind the upper portion of the wall 3. The elements 10 and 11 are adapted to be respectively swung upwardly and downwardly from these normal positions to horizontal display positions in which their signal arms or display portions 12 and 15 will lie horizontally and be exposed through the opening 5 in front of the panel 9, whereby a right or left turn signal will be given.

The rearwardly extending ends 13 and 16 of the respective signal elements 10 and 11 are provided with disk-like enlargements 13' and 16' which are concentric with the shaft 18, and each of which is provided with a keeper or locking notch 20 and a locking shoulder 21. These notches and shoulders are adapted for coaction with the locking and detent arm 22 of a locking and detent member 23 pivotally mounted at one end on a bracket 24 carried by the casing. When either signal element is in display position the arm 22 of the pivoted locking and detent member 23 is adapted to engage the notch 20 therein to hold said element in display position as long as it is desired to keep it in such position and against shifting out of position due to vibratory or other movements of the vehicle. When either signal element is in its normally retracted position the arm 22 of the pivoted locking and detent element engages the detent shoulder 21 of said member to hold the signal element in such position and against displacement under disturbing forces. The arm 22 of the locking and detent member 23 is adapted for cooperation with the locking and detent disks of both signal elements whereby a very simple and compact arrangement of these parts is provided. A U-shaped coiled spring S is arranged about shaft 18 and has the ends of its arms respectively engaged with the ends 13 and 14 of the signal elements 10 and 11. This spring holds said signal elements normally in retracted position and returns each signal after operation to normal position upon its release by the locking device 22. The coil of the spring tends to normally spread the arms of the spring apart. The lower arm of the spring engages the upper edge of the adjacent arm of the signal element 10 and normally forces said element downward to non-signaling or retracted position, while the upper arm of the spring engages the lower edge of the adjacent arm of the signaling element 11 and forces said element upward to non-signaling or retracted position. When either signaling element is moved to signaling position the spring arm which acts on it is placed under tension for reaction when the signaling element is released to return the same to retracted position.

Pivotally supported solenoids 25 and 26 are provided for respectively shifting the signal elements 10 and 11 to display or signalling position. The cores 25' and 26' of these respective solenoids are pivotally connected with the ends 13 and 16 of the signal elements so that when the solenoid 25 is energized the signal element 10 will be moved to display position, while when the solenoid 26 is energized the signal element 11 will be moved to display position. These signal elements are designed in practice to be independently operated by the energization of their respective solenoids in such manner that only one or the other of the signal elements may be operated at a time. A solenoid 27 is provided for controlling the locking and detent member 23, which is pivotally connected to the core 27' of said solenoid. This core is movable in the solenoid in the usual manner so as to be drawn inwardly when the solenoid is energized, but a suitable spring 28 is provided within the solenoid which acts to move the core 27' outwardly when the solenoid is deenergized. Energization of the solenoid 27 moves the member 23 to signal releasing position. At all times when this solenoid is deenergized the core 27' is projected by the spring 28 so that the member 23 is arranged for locking or detent engagement with the locking and detent disks 13' and 16' of the signal elements. Where the construction is such as to allow solenoids with small cores or a short range of travel the solenoids may be rigidly instead of pivotally mounted.

Arranged within the compartment 8 is a socket 29 to receive an electric lamp or bulb 30 designed when energized to illuminate the compartment 8 and the signal panel 9. The bulb is adapted to be thrown into action when either signal element is moved to display position to give a light flash signal calling attention to the signal indication. The bulb is also adapted to be operated in practice, and as hereinafter described, whenever the brake pedal of the vehicle is depressed to give through its rays transmitted through the red panel 9 a stop signal indication or a speed reducing signal indication, so that the operators of following vehicles may be warned that the driver of the vehicle equipped with the signal is about to bring his vehicle to a stop or to slow down or check its speed. The arrangement is also such that as long as either signal element 10 or 11 is in display position the lamp 30 will glow and a red light will be transmitted through the panel 9, to increase the effectiveness of the signal in daytime and to illuminate the compartment 7 to bring the displayed signal element clearly into view through the aperture 5 in the night time. The fact that the elements 10 or 11 are displayed only when a direction signal is given, and that no portions of these elements appear normally, or when a stop signal indication only is to be given, ensures the giving of clear and distinctive signals not liable to cause confusion or double as to the character of the signal being given.

Fig. 9 shows the circuit connections and means for controlling the same to govern the action of the signal elements and lamp. As shown the socket comprises a shell 29, of conducting material, which is supported by a bracket 31 secured to the casing 1 and is insulated from the bracket 31 and casing 1 by an insulating bushing sleeve 32. The shell of the lamp when the latter is fitted in the socket contacts with said shell 29. The socket also includes a spring pressed center contact electrode 33 insulated from the shell 29 by a bushing 34 and which contacts with the center electrode of the lamp when the lamp is fitted in the socket. In connection with the shell 29 is a conductor 35 and a contact arm 36, and in connection with the electrode 33 is a conductor 37. The conductor 37 forms part of a signal circuit including a battery B, from the positive pole of which said conductor 37 leads, a series of conducting branches 38, 39 and 40 connected at the common junction point 41 to the conductor 37, a conductor 42 connecting all of said branches with the casing 1 and through the casing 1 to ground, i. e., the vehicle frame, and a conductor 43 similarly connecting the negative pole of the battery with the casing and ground. The branches have respectively arranged therein the coils of the solenoids 25, 26 and 27 and said branches are normally open and adapted to be respectively closed by push button switches designated R, L and N, respectively. These switches may be arranged on the instrument board or steering wheel of the vehicle in position to be conveniently operated by the driver. By the operation of these switches R, L, N the respective solenoids 25, 26 and 27 are controlled to move either signal 10 or 11 into operative positive and to neutralize or release the same for return to normal or non-indicating position. Conductor 35 forms part of an auxiliary circuit for energizing the lamp 30 independent of the main signal circuit above described when the brake pedal 44 of the vehicle is depressed to stop or check the speed of the vehicle. This auxiliary circuit includes, besides the conductor 35, a conductor 45 and a switch 46 adapted to be operated by the pedal 44 to connect said conductors and thereby connect the shel 29 of the lamp with the negative pole of the battery and the casing 1 and ground.

In the use of the signal device, it will be understood that the signal elements 10 and 11 are normally held in retracted position by their retracting spring S, the circuits are open and the signal lamp 30 inactive. Should the driver desire to indicate that he is about to make a right turn, he presses switch R, whereupon branch 38 of the main circuit will be connected with the positive pole of the battery B so that current will flow through the solenoid 25 and thence to the casing 1, the circuit being completed through the casing and from the negative pole of the battery to ground on the vehicle frame. Energization of solenoid coil 25 causes actuation of its core 25′ to shift signal element 10 to indicating position, in which its detent shoulder 21 moves out of engagement with arm 22 of locking device 23 and its locking notch 20 is brought into engagement with said locking arm, thus locking the element 10 in indicating position and against retraction by spring S. As a result of this action end 16 of element 10 will be brought into engagement with the contact arm 36, and a circuit will thereby be completed causing current to flow through the lamp 30, whereby a red light signal is also given to more distinctly call attention to the displayed signal element 10. When the turn is completed the operator by depressing neutralizing button N will energize the releasing solenoid 27 whose core will be actuated to move the locking device 23 to retracted position, thus cutting off the flow of current to the lamp and also cause the release of signal element 10 for return to normal position by spring S. In like manner the driver by operating push button L may energize solenoid 26 to shift the left turn indicating signal 11 to operative position in which it will be locked by the locking device 23, and this signal element may thereafter be released by the depression of push button N whereby the locking device 23 will be retracted. On each of these signal operating and releasing actions, in which the signal arm 16 or signal arm 17 acts in connection with arm 36 as a circuit closing switch, the lamp 30 will be caused to glow. When either end 16 of element 10 or end 17 of element 11 contacts with switch arm 36 a circuit is established from the positive pole of the battery B to the center electrode of the lamp 30, through the lamp filament to shell 29, and thence through arm 36 and arm 16 or 17, as the case may be, and to casing 1, to which arms 16 and 17 are electrically connected by their pivot pin, and then through casing 1 to the negative pole of the battery or to ground. On the release of any of the push buttons L or N, however, the circuit will be broken so that after a signal element is set or released no current will flow in the system, although either signal element may be maintained in its operative position as long as desired and until it is released by retraction of the locking device 23. Thus the driver may in a very convenient manner operate the signal elements to give either a right turn or a left turn indication, and retract them after a desired interval or as soon as the intended turn is made. In the event that the foot pedal 44 is depressed to bring the vehicle to a stop or to check its speed, the lamp 30 will be caused to glow so that a red light will shine through the panel 9 and aperture 5 to give a stop signal indication. In this operation of the lamp by the foot pedal and through the auxiliary circuit, no current flows through the controlling solenoid, the flow of current being from the positive pole of battery through the conductor 37 to the central electrode of the lamp 30, through the lamp filament, and thence through the lamp shell 29 and conductors 35, 45 and 43 to the negative pole of the battery and to ground through the signal casing. The driver of a car following the vehicle equipped with the signal will therefore be advised of the fact that the driver of the car giving the signal intends to bring his vehicle to a stop or to check his speed, so that liability of a collision will be avoided. It will, of course, be understood that the use of the foot pedal controlled auxiliary circuit may be dispensed with if its use is not desired.

From the foregoing description, taken in connection with the drawings, the construction and mode of operation of my improved signal device will be readily understood without a further and extended description, and it will be seen that the invention provides a signal device which may be mounted upon any convenient part of the vehicle and which may be operated in a ready and convenient manner by the driver of the vehicle to give the signal indications described. Inasmuch as the flow of current to the signal giving or energizing elements is but momentary and cut off immediately upon the actuation of the operated part, it is evident that economy in the use of current is assured. The design of the circuit connections is also such that a signal lamp 30 of very low power may be effectually used. A material advantage resulting from my improved construction of signalling device is that, while the signal arms are prominently and distinctly displayed, they are not arranged behind a lens or glass surface and hence while protected are not obscured by rays of sunlight or sun ray glare such as caused by sunlight rays striking a glass surface. Through the described arrangement of the glass panel 9, this panel is also shielded by the upper and lower walls of the aperture 5 against direct sunrays, so that a red signal light transmitted therethrough will be clear and unobscured by sunray glare. In each movement of a signal element to indicating position, as the signal element is brought in line with the aperture 5 and between the same and the glass panel 9, the signal element will show clearly and distinctly against a colored background, whether illuminated or not, and in the event that this background is illuminated a very clear and distinct display of the signal element is given at night. Inasmuch, also, as the signal elements 10 and 11 are normally disposed out of the path of travel of light rays from the lamp and through the panel 9 and aperture 5, a clear and unobstructed stop signal may be given in such a way as to avoid all liability of confusion.

While the construction of the signal device as herein shown is preferred, it is to be understood that changes in the form, details of construction and proportion of the parts may be made within the scope of the appended claims without departing from the spirit or sacrificing any of the advantages of the invention.

What I claim is:

1. A signal device comprising a casing having a display aperture at the front thereof, a pair of substantially U-shaped signaling elements disposed in the casing, each signaling element comprising a display blade or plate designed for display at said aperture and having rearwardly extending arms at its ends, means coaxially pivoting the arms of the signaling elements at the respective sides of the casing to adapt the signaling elements to swing upwardly and downwardly, said signaling elements being respectively normally disposed in retracted positions in which one is tilted upwardly at an angle on its pivotal connections to dispose its display blade above the plane of the aperture and the other tilted downwardly on its pivotal connections to dispose its display blade below the plane of the aperture, each signaling element being movable from such position to bring its display blade into signaling position in line with the aperture and the pivotally mounted arms of the signaling elements located at one side of the casing being provided each with an arcuate surface concentric with the pivotal mounting and formed with a locking notch and a stop shoulder, a U-shaped spring having a coiled central portion supported on the pivotal connection of the arms of the signaling elements at one side of the casing and having arms engaging said arms of the signaling elements and exerting pressure thereon for normally holding the signaling elements in retracted position and returning them to retracted position after a signaling action thereof, solenoids for moving the signaling elements selectively to signaling position against the resistance of the spring means, a pivoted locking device automatically engageable with the notch of either signaling element to hold said element in signaling position against the action of the spring means and with the shoulder of said element to limit the retractive movement thereof beyond a predetermined position, and a solenoid energizable for retracting the locking device when in engagement with the locking notch of either signaling element to permit said signaling element to be moved from signaling position to retracted position by the action of the spring.

2. A signal device comprising a casing having a display aperture at the front thereof, a pair of substantially U-shaped signaling elements disposed in the casing, each signaling element comprising a display blade or plate designed for display at said aperture and having rearwardly extending arms at its ends, means coaxially pivoting the arms of the signaling elements at the respective sides of the casing to adapt the signaling elements to swing upwardly and downwardly, said signaling elements being respectively normally disposed in retracted positions in which one is tilted upwardly at an angle on its pivotal connections to dispose its display blade above the plane of the aperture and the other tilted downwardly on its pivotal connections to dispose its display blade below the plane of the aperture, each signaling element being movable from such position to bring its display blade into signaling position in line with the aperture and the pivotally mounted ends of the signaling elements at one side of the casing being provided with spaced locking and stop surfaces, spring means acting on said signaling elements for normally maintaining them in retracted position and returning them to retracted position after a signaling action thereof, solenoids connected to the arms of the signaling elements at one side of the casing for moving the signaling elements selectively to signaling position against the resistance of the spring means, a locking device automatically engageable with the locking and stop surfaces of either signaling element to respectively hold said element in signaling position against the action of the spring means and to limit the retractive movement thereof beyond a predetermined position, and a solenoid energizable for retracting the locking device when in engagement with the locking surface of either signaling element to permit said element to be moved from signaling position to retracted position by the action of the spring means.

DE WILL G. VAUGHN.